June 23, 1942.   R. J. STAVA   2,287,577
ADJUSTABLE SUPPORT
Filed March 15, 1940   2 Sheets-Sheet 1
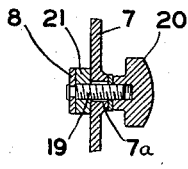
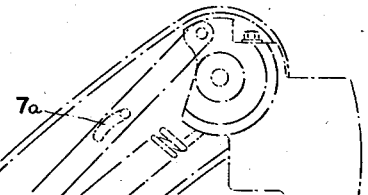
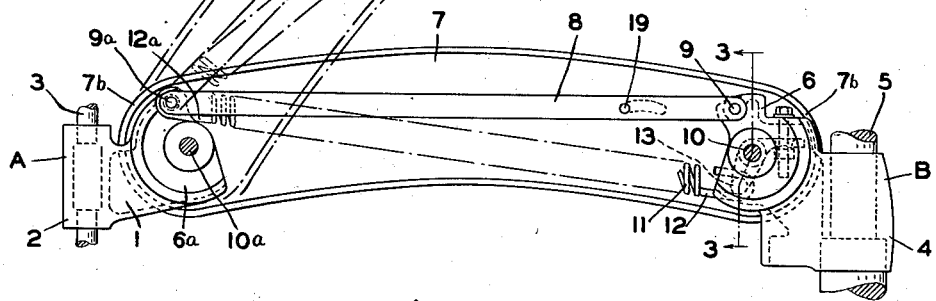
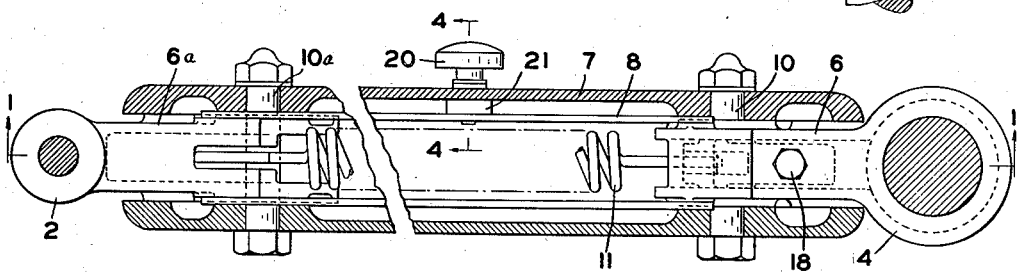
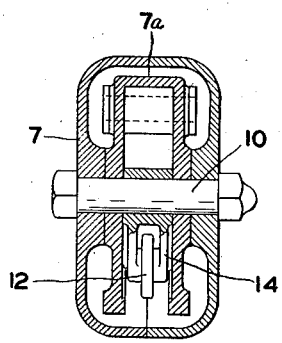
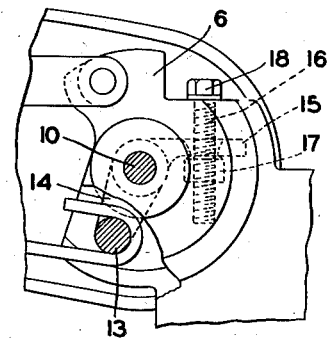
INVENTOR
ROBERT J. STAVA
BY
Hyde and Meyer
ATTORNEYS June 23, 1942.  R. J. STAVA  2,287,577
ADJUSTABLE SUPPORT
Filed March 15, 1940   2 Sheets-Sheet 2

INVENTOR
ROBERT J. STAVA
BY
Hyde and Meyer
ATTORNEYS

Patented June 23, 1942

2,287,577

UNITED STATES PATENT OFFICE 2,287,577

ADJUSTABLE SUPPORT

Robert J. Stava, East Cleveland, Ohio, assignor to Picker X-Ray Corporation Waite Manufacturing Division, Inc., Cleveland, Ohio, a corporation of Ohio Application March 15, 1940, Serial No. 324,148

3 Claims. (Cl. 248—280)

This invention relates to adjustable supports, such as are employed for supporting any device which it is desirable to hold at different levels or where it should be movable up and down to various positions.

One object of the invention is to provide an adjustable support of this kind where the carrier member moves substantially by parallel ruler motion so that in its various positions its angular relation to the horizontal does not change, and in which said carrier is yieldably supported and will remain motionless in any position to which it may be adjusted.

A further object of the invention is to provide adjustable supporting means of the parallel ruler type described, in which one set of the parallel ruler links not only forms the frame or body of the unit as a whole, but also serves to enclose and protect the operating parts.

Still another object is to provide an adjustable support of this kind in which the housing or enclosing link member also encloses, shields and protects the yieldable device, such as a spring.

Further objects of the invention are in part obvious and in part will appear more in detail hereinafter.

In the drawings, which represent one suitable embodiment of the invention:

Fig. 1 is a sectional elevation on the line 1—1, Fig. 2, the full lines representing the support in one of its lower positions and the dotted lines in an upper position;

Fig. 2 is a plan view on a larger scale, illustrating the parts in the position shown in full lines, Fig. 1, the casing being broken away in section;

Fig. 3 is a sectional elevation on approximately the line 3—3, Fig. 1, looking in the direction of the arrows; and Fig. 4 is a detail sectional elevation on the line 4—4, Fig. 2;

Fig. 5 is a detail elevation of the parts at one end of the support, corresponding to Fig. 1 and on a larger scale;

Figure 6:
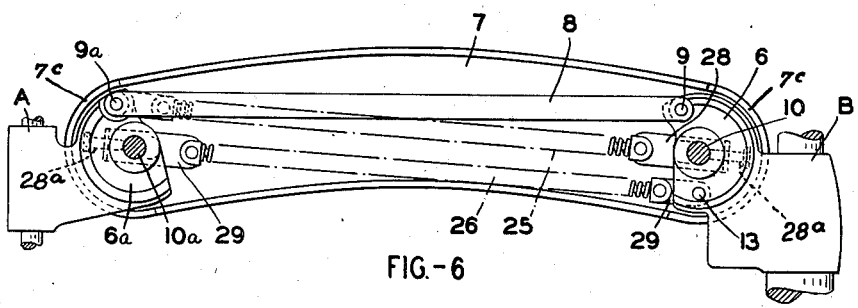
Fig. 6 is a sectional elevation, corresponding to Fig. 1, and illustrating a modification.

The supporting means or mechanism of the present invention is adapted for a wide variety of uses, particularly where some device to be supported desirably may be moved to and held at different levels, with its motion of adjustment in a vertical plane, all without disturbing its angular relation with reference to the horizontal. For example, the invention provides a suitable supporting arm for an X-ray tube, in which said arm is mounted upon a table, or upon a pillar or support suitably mounted on a firm foundation, providing the ability to move the X-ray tube to various levels and still maintain its relation to a horizontal plane. It will be understood, however, that the invention is not limited to such use, although the particular arrangement shown in the drawings is especially designed for use as an X-ray tube supporting arm.

The mechanism shown in the drawings comprises two members, marked respectively A and B, one of which serves as a base and is designed for attachment or connection to some supporting device mounted upon a firm foundation, and the other of which serves as a carrier member to support the device to be carried, such as the X-ray tube referred to. Either of said members may serve as the base and the other as the carrier member. The drawings show member A designed for use as the base member, it comprising a body member 1 having a sleeve portion 2 designed to be mounted either stationarily or for vertical sliding or for rotating adjustment upon a post or pillar 3, shown conventionally, but which will be understood to be mounted upon a firm foundation, such as the floor, the wall, a table, or a part of an X-ray machine.

The other member B is shown as designed to carry an X-ray tube, being provided with a sleeve portion 4 into which a cylindrical rod 5, attached to or carried by the X-ray tube (not shown), may be inserted or fastened.

Members A and B are generally of similar form, each having its sleeve-like body portion provided with an outwardly extending ear 6 or 6a of generally plate form, said two ears, in the assembled mechanism lying in substantially the same plane.

Said two ears are connected by two sets of substantially parallel rigid links, to-wit, a pair of links 7, forming one set, and a pair of links 8, forming the other set. Each set of links is pivotally connected at its opposite ends to each of the two members A, B, the arrangement being such that the four pivotal axes, marked respectively, 9, 9a, 10, 10a, are at the four corners of a parallelogram. Thus, when one of said members, such as member A, is held stationary, and the other member, such as B, is moved relatively to it in its only direction of motion, in a vertical plane, the motion is that commonly referred to as parallel ruler motion, with members A and B maintaining parallel relation to each other and without disturbance of the angular relation of the moving member, such as B, to a horizontal plane.

Means is provided for yieldably supporting the arm consisting of member B and links 7 and 8, in any of the positions to which it may be adjusted. The means shown comprises one or more elongated tension springs 11, one thereof being shown, the opposite ends of which are connected to two of the members of the parallelogram which are movable relative to each other during adjustment of member B to various positions. The opposite ends of the spring, for example, may be attached to opposite members of the parallelogram, such as one end to link 7 and the other end to link 8, or one to member B and the other to member A. The drawings show the latter arrangement, one end of the spring having an end loop 12a hooked around the pin at 9a forming the pivotal connection between link members 8 and base A, the other end of the spring having a similar end loop 12 hooked around a pin 13, mounted on an arm 14 of a two-armed lever journalled on the pin at the pivotal axis 10, the other arm 15 of said lever having an opening through which passes an adjusting bolt 16 provided with a nut 17 and a head 18, the latter resting against an outer face of the body of the carrier member B. The tension of said spring always tends to press the arm 15 toward nut 17, so that in effect the pin 13 is a rigid part of the carrier member B, but is adjustable to various positions thereon by rotation of the bolt 16 while holding the nut 17 stationary. By adjusting this bolt in the manner described the tension of the spring may be varied within reasonable limits to adapt it to the weight of the parts of the particular arm in which it is used or to variation in the weights of other devices, like X-ray tubes, supported thereby.

With this arrangement, assuming the supporting arm in one of its lower positions, as in full lines, Fig. 1, spring 11 is under tension with a constant tendency to change the shape of the parallelogram formed by members 7, 8, A, B, and thereby to move the supporting arm about the pivotal axis at 10a toward its upper position, shown in dotted lines Fig. 1.

Of course, as the arm swings upwardly, the center of gravity of its moving parts moves (including the weight of the part to be supported, such as the X-ray tube) to the left in Fig. 1, with a decrease in the gravity effect of said parts. Therefore, by choosing a spring of the proper coil arrangement and strength, and by selection of pivot locations with regard for the rate of spring extension as the arm is lowered, and considering Hooks' law and the friction between relatively movable parts, the arrangement may be made such that when the arm as a whole is adjusted to either its extreme upper or lower position or to any intermediate position, the spring tension is substantially of the value necessary to support the arm stationarily in any position to which it is adjusted. Therefore, if the parts are made accurately, even though the arm supports a fairly heavy weight it may be readily adjusted manually to any position and will stay where put.

However, in case it is desired to rigidly hold the arm in one of its adjusted positions, positive locking means may be provided, such as a pin 19 attached to one set of the parallel ruler links and adapted to be clamped to the other set of such links. As shown, pin 19 is attached to a link 8 and extends out through a slot or opening 7a in one of the links 7, being provided on its outer end with a manually operable clamping nut 20, by which the parts can be clamped together, it being understood that a washer 21 is inserted between links 7 and 8. Pin 19 works back and forth in the slot in link 7, as the arm is moved up and down. When the arm is adjusted to any position the nut 20 may be screwed up to tightly clamp the parts together and hold them in any position to which they are set.

In the present arrangement one set of links is made to serve as the supporting frame, such links being of sufficient strength for the purpose, and also as an enclosure for all of the other working parts. In the arrangement illustrated links 8 are in the form of long flat relatively narrow bars, their ends being mounted upon pins at the pivotal axes 9, 9a.

Links 7 are of much wider plate form, with their opposite ends curved about the pivotal axes 10, 10a as centers, the edges of the two plates extending toward each other so that except at the extreme ends of the device the plate edges contact at 7a along the median plane, as shown in Fig. 3, and together said plates constitute a complete enclosure. At the ends of said plates their edges are separated to provide curved slots 7b in the ends of the arm through which the plate members 6, 6a extend, said slots being long enough to permit the desirable motion of adjustment of the arm as a whole.

Figure 7:
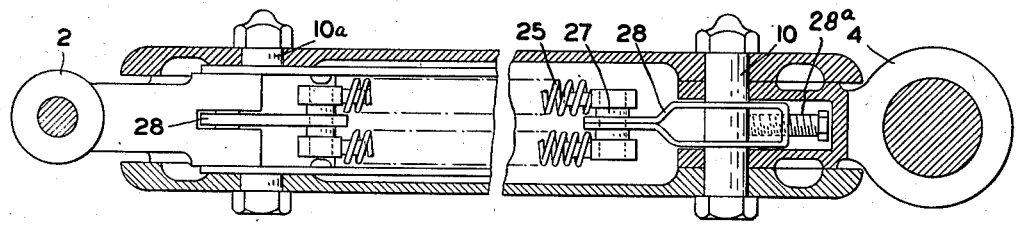
Fig. 7 is a sectional plan view thereof, corresponding to Fig. 2.

Figs. 6 and 7 show another arrangement. Here the base and carrier members A, B, and the link members 7, 8 are arranged as before and as illustrated in Fig. 1. However, instead of using a single spring 11, as in Fig. 1, four springs are used, to-wit, two upper springs 25, lying side by side, and two lower springs 26. Loops at the opposite ends of the springs of the upper pair 25 are fastened to the opposite ends of pins 27 mounted in pivot members 28 pivoted respectively upon the pivot pins 10 and 9a. Similar pivot members 29 at the ends of the springs of the lower pair are pivotally connected respectively to the pivot pins 13 and 10a. The screw 28a threaded in member 28 and having its inner end engaging pin 10 (or 10a) is accessible through opening 7c in housing 7 to adjust the tension of springs 25.

In this arrangement increased spring resistance for supporting a heavier load is provided without unduly multiplying the maximum spring extension. Here, also, one pair of springs, 25, extends across a diagonal of the parallelogram between pivot points 9a and 10, while the other pair of springs, 26, extends from one corner of the parallelogram, at 10a, to an outside point, at 13. The manner of operation of this device, however, is substantially the same as that illustrated in Fig. 1.

Figure 8:
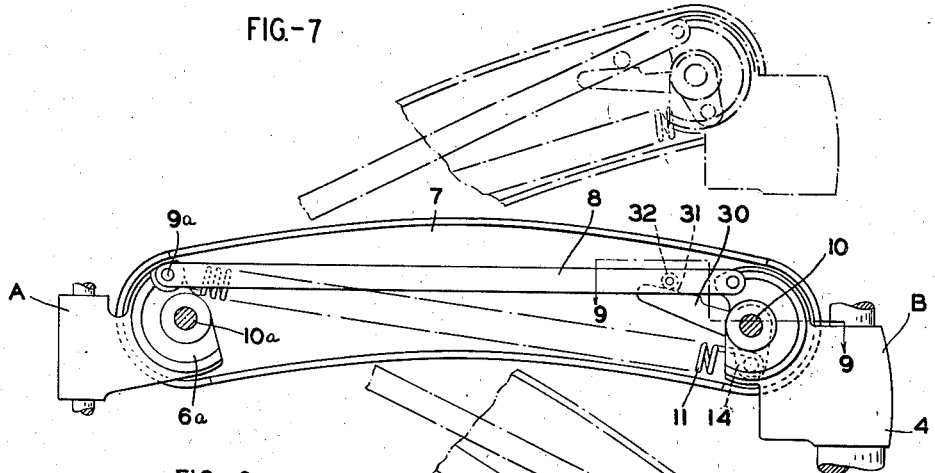
Fig. 8 is a view, also corresponding to Fig. 1, and illustrating still another arrangement.
Figure 9:
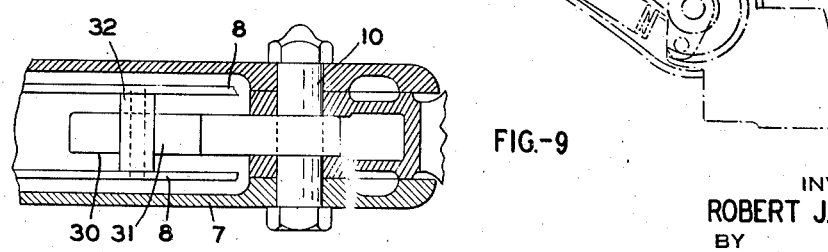
Fig. 9 is a detail sectional plan view on approximately the line 9—9, Fig. 8.

Figs. 8 and 9 illustrate still another embodiment of the invention. Here the base and carrier members A, B and the links 7, 8, as well as the spring 11, are arranged in the same manner illustrated in Fig. 1. But means is provided to introduce into the mechanism a compensating adjustment to take care of variations in strength of the spring as it varies in length during adjustment of the swinging arm.

While any arrangement suitable for the purpose may be employed, the particular arrangement shown in the drawings for purposes of illustration accomplishes the result by securing one end of spring 11 to a lever, as in Fig. 1, and providing for automatic instead of manual adjustment of said lever. As illustrated, one end of spring 11 is connected to the pivot at the point 9a. The other end of said spring is pivotally connected to one arm 14 of a two-armed lever pivoted at 10, the other arm 30 of said lever extending generally parallel with links 8, and between them, its upper face 31 engaging a pin 32 cross-connecting the two links 8, as shown in Fig. 9. As the arm is moved up and down through its various positions, as shown in dotted lines, Fig. 8, the arm 30 and pin 32 move relatively to each other, pin 32 travelling along the upper surface of arm 30, as it were, and the effect of this motion is to automatically produce turning adjustment of the two-armed lever around its pivot 10. By appropriately shaping the surface 31 of lever 30, which contacts with the pin 32, or in other words, by more or less curving it as a cam, the mechanism may be so arranged as to prevent undue stretching of the spring and to more or less cause it to be stretched or elongated in accordance with variations of the load moment of the swinging arm and its parts during its adjustment to its various positions. Thus in every position of the arm the spring tension is substantially just sufficient to balance the supporting arm and the device supported thereby.

The construction described is relatively simple, may be made and assembled at low cost, is not likely to get out of order in service, and supplies an efficient arm which may be set in any position and there yieldably supports the device carried by the carrier member.

Other advantages of the invention will readily occur to those skilled in the art.

What I claim is:

1. Supporting means of the character described, comprising base and carrier members, two sets of link members connecting the same for parallel ruler motion in a vertical plane, a spring connecting two of said members which are movable relatively to each other in such manner as to change the shape of the parallelogram and elevate the carrier member relative to the base member, means for varying the tension of said spring, and one of said sets of link members being in plate form arranged to enclose the other set of link members and said spring and said varying means.

2. The combination of claim 1 wherein said spring is a helical tension spring, and said means for varying the tension of said spring comprises a tension member engaging said spring, and a screw having threaded engagement with said tension member, said screw engaging a fixed abutment and being accessible for adjustment through said plate form.

3. Supporting means of the character described, comprising four members pivotally connected in generally parallelogram form, including oppositely disposed base and carrier members and oppositely disposed link members, spring means connecting two of said members which are relatively movable in such manner as to vary the parallelogram form and move the carrier member relative to the base member, a lever operatively connected with said spring means for varying the tension thereof, and coacting cam and follower parts for holding said lever in various adjusted positions, one of said parts being carried by one of said four members, and the other of said parts being operatively connected with said lever, said cam part having a controlling surface for loading said spring means to balance the turning moment of said carrier member and parts movable therewith in all operative positions of said supporting means, whereby said carrier member will move freely and will remain in any position to which it is moved.

ROBERT J. STAVA.